(12) United States Patent
Ingram

(10) Patent No.: US 6,398,157 B1
(45) Date of Patent: Jun. 4, 2002

(54) AIRCRAFT

(75) Inventor: David Barry Ingram, Crewkerne (GB)

(73) Assignee: GKN Westland Helicopter Limited, Yeovil (GB)

( * ) Notice: Subject to any disclaimer, the term of this patent is extended or adjusted under 35 U.S.C. 154(b) by 0 days.

(21) Appl. No.: 09/737,825

(22) Filed: Dec. 18, 2000

(30) Foreign Application Priority Data

Dec. 29, 1999 (GB) ............................................. 9930728

(51) Int. Cl.[7] .............................................. B64C 27/22
(52) U.S. Cl. ......................................... 244/7 B; 244/46
(58) Field of Search ........................ 244/7 B, 46, 7 C, 244/7 R, 23 A

(56) References Cited

U.S. PATENT DOCUMENTS

| 2,622,826 A | 12/1952 | Prince ............................. 244/7 |
| 2,695,144 A | 11/1954 | Woods .......................... 244/46 |
| 2,743,886 A | * 5/1956 | Driggs et al. ................ 244/7 B |
| 2,859,003 A | 11/1958 | Servanty ....................... 244/12 |
| 3,490,720 A | 1/1970 | Girard |
| 3,565,369 A | * 2/1971 | Barton .......................... 244/46 |
| 3,669,367 A | * 6/1972 | Rhodes et al. ................. 244/46 |
| 4,296,894 A | 10/1981 | Schnäbele et al. .......... 244/3.27 |
| 4,569,493 A | 2/1986 | Burhans, Jr. |
| 5,289,994 A | * 3/1994 | Del Campo Aguilera ..... 244/78 |
| 5,340,057 A | 8/1994 | Schmittle ...................... 244/48 |
| 5,516,060 A | * 5/1996 | McDonnell ................... 224/78 |
| RE36,487 E | * 1/2000 | Wainfan ..................... 244/7 B |

FOREIGN PATENT DOCUMENTS

| DE | 3334758 A1 | 4/1995 |
| GB | 1417653 | 12/1975 |

* cited by examiner

Primary Examiner—J. Woodrow Eldred
(74) Attorney, Agent, or Firm—Larson & Taylor, PLC

(57) ABSTRACT

An aircraft capable of vertical take off and normal cruise flight has a fuselage and a pair of wings, the wings being movable relative to the fuselage from a rearwardly swept position to which the wings are moved for vertical take off, to a spread position to which the wings are moved for normal cruise flight.

18 Claims, 1 Drawing Sheet

AIRCRAFT

BACKGROUND TO THE INVENTION

This invention relates to an aircraft and more particularly to an aircraft which is capable of vertical take off and preferably also, vertical landing (VTOL).

DESCRIPTION OF THE PRIOR ART

Such aircraft are known which are of configurations which have come to be known as "tailsitters", an example being disclosed in U.S. Pat. No. 5,289,994. In this previous specification, a VTOL aircraft is described which has a pair of fixed wings which provide lift in normal horizontal or cruise flight, and helicopter-like rotors or propellers to provide lift during vertical take off and landing, and thrust in cruise flight.

On the ground, the aircraft is adapted to sit on a tail structure thereof with a fuselage extending generally vertically.

Other examples of similar aircraft are disclosed in U.S. Pat. Nos. 2,622,826, 2,859,003, and U.S. Pat. No. 5,516,060. In the latter two prior proposals, jet thrust instead of rotor/propeller thrust is utilised. In each of these examples, the wings which provide lift during normal horizontal flight are fixed relative to a fuselage thereof, although the wings may be provided with ailerons and the like for cruise flight control.

Such fixed wings having a relatively high aspect ratio are capable of achieving good cruise efficiency especially in the generally low speed horizontal flight regime of such aircraft but the fixed spread position impairs hover and low speed stability and control in the vertical take off and landing mode.

SUMMARY OF THE INVENTION

According to one aspect of the invention we provide an aircraft having a fuselage and a pair of wings and being capable of vertical take off with the fuselage generally vertical and normal cruise flight with the fuselage generally horizontal, the wings being movable relative to the fuselage from a rearwardly swept position to which the wings are moved for vertical take off, to a spread position having a higher aspect ratio to which the wings are moved for normal cruise flight.

By virtue of the wings being so movable, improved low speed performance and control, particularly during and immediately after vertical take-off can be achieved with the wings in the rearwardly swept position.

It is well known in conventional aircraft which take off and land generally horizontally to provide so called swing wings, by means of which a wing spread position can be provided during take-off and landing, and a rearwardly swept position can be provided during high speed cruise flight. In an aircraft in accordance with the invention which is capable of at least vertical take off, an opposite regime is adopted.

By moving the wings during vertical take off, to a rearwardly swept position, the distance of wing control surfaces, such as ailerons/flaps or the like from a centre of gravity of the aircraft, is increased, to provide a lengthened moment arm to increase the control forces which can be achieved by moving the control surfaces.

Furthermore, with the wings in the rearwardly swept position, the space required for storage of the aircraft is reduced.

In general, VTOL aircraft of the kind with which the invention is primarily concerned are not required to achieve very high speed forward cruise flight, but may achieve cruise flight speeds in the range 150 to 200 knots. At such relatively low speeds the higher aspect ratio of the wings in the spread position provides an improved lift/drag ratio to optimise the efficiency of the aircraft during normal cruise flight.

If the invention was applied to an aircraft which was capable of higher speed forward flight, if desired in such high speed mode of operation, the wings may be swept rearwardly to an interim or fully swept position to reduce the aspect ratio and to improve efficiency at such higher forward speeds.

The aircraft of the invention may have an e.g. cruciform configuration tail structure including tail wings and, prior to take off, the aircraft may sit on the tail structure.

In a preferred arrangement, the aircraft is capable of both vertical takeoff and landing. Thus preferably the wings are moveable to the rearwardly swept position during landing as well as take-off.

Thrust at least for take-off, and landing where the aircraft is capable of vertical landing, may be provided by a rotor/propeller system, which may include a pair of contra-rotating rotors which mutually counteract torque reactions. Such rotor system may be provided at or adjacent a nose structure of the aircraft.

Alternatively or additionally, thrust at least for take-off, and landing where the aircraft is capable of vertical landing, may be provided by a jet thrust preferably provided in the fuselage e.g. at a tail end of the aircraft.

If desired, a rotor system may be used to achieve thrust during at least take-off, and landing where the aircraft is capable of vertical landing, and thrust may be provided by a jet thrust during normal cruise flight.

A rotor system is preferred for at least take-off, and landing where the aircraft is capable of vertical landing, for finer stability and control, for manoeuvring and hovering.

The aircraft may be used as an un-manned aerial vehicle.

According to a second aspect of the invention we provide a method of operating an aircraft having a fuselage and a pair of wings, and being capable of vertical take-off with the fuselage generally vertical and normal cruise flight with the fuselage generally horizontal, the method including moving the wings relative to the fuselage to a rearwardly swept position for vertical take-off, operating a thrust means to achieve vertical take-off, manoeuvring the aircraft to the normal cruise flight condition, and moving the wings relative to the fuselage to a spread position for normal cruise flight.

Preferably the wings are moved relative to the fuselage from the swept position to the spread position during the transition from vertical flight to normal cruise flight.

The method of the invention may include moving the wings from the spread position to the rearwardly swept position during transition from normal cruise flight to vertical flight prior to vertical landing.

The aircraft to which the method of the second aspect of the invention is applied, may have any of the features of the aircraft of the first aspect of the invention.

BRIEF DESCRIPTION OF THE DRAWINGS

The invention will now be described with reference to the accompanying drawings in which.

DESCRIPTION OF THE PREFERRED EMBODIMENTS

Figure 1:
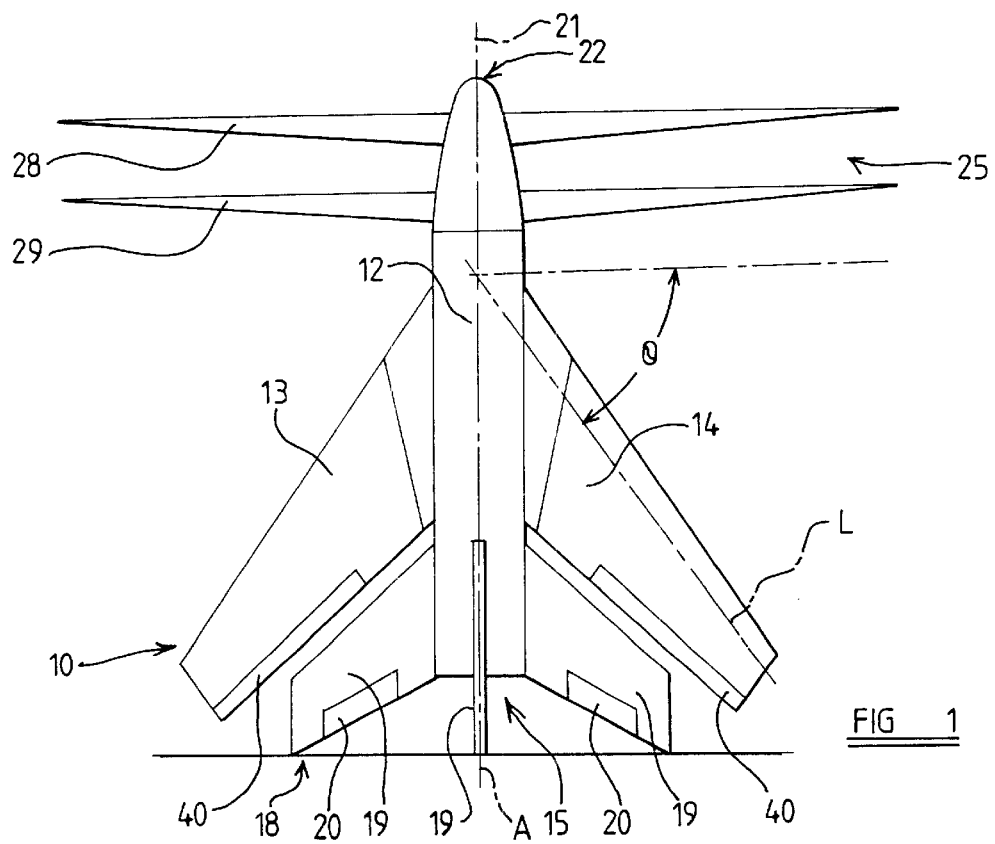
FIG. 1 is an illustrative side view of an aircraft in accordance with the invention in a vertical position prior to vertical take-off.

Referring to the drawings, an aircraft 10 of the kind which is capable of vertical take-off and landing, includes a fuselage 12, and a pair of wings 13, 14. At a tail end 15 of the fuselage there is a cruciform tail structure 18 which includes four tail wings 19 each having an aerodynamic control surface 20.

The aircraft 10 further includes a nose structure 22 which in this example mounts a motor/propeller system 25 which has a first multi-bladed rotor 28 which in use rotates in a first direction e.g. clockwise about a longitudinal axis A of the aircraft and is located axially outermost, and a second multibladed rotor 29 which in use rotates in a second opposite direction about axis A to the first rotor 28, the second rotor 29 being located axially innermost. Thus the rotors 28, 29 are generally parallel and rotate in opposite directions, thus mutually counteracting torque reactions produced by the other of the rotors 28, 29.

Referring now to FIG. 1, the aircraft 10 is shown with the fuselage 12 in a generally vertical position prior to take-off The aircraft 10 sits on the cruciform tail structure 18 which is adapted to support the weight of the aircraft 10 on the ground. The wings 13, 14 are in a rearwardly swept position in which the wings are moved close to the fuselage 12 and a wing quarter chord line L is swept rearwardly at an angle θ from a line perpendicular to a fuselage (longitudinal) centre line 21.

By virtue of the rearwardly swept wing position, during vertical flight, better control and stability of the aircraft 10 is achievable, than for an aircraft having wings in a spread position in which the wing quarter chord line L is perpendicular or approximately perpendicular to the fuselage centre line 21.

To achieve take-off, the rotors 28, 29 are rotated about axis A at a sufficient speed to achieve the necessary thrust for take-off. Thus there may be provided an engine within the fuselage 12, connected to the rotors 28, 29 by a transmission which may be of a similar construction to that used for a helicopter main sustaining rotor system. By virtue of the rotor system 25, the aircraft 10 may be made to hover in vertical flight, in the same manner as a helicopter.

Figure 2:
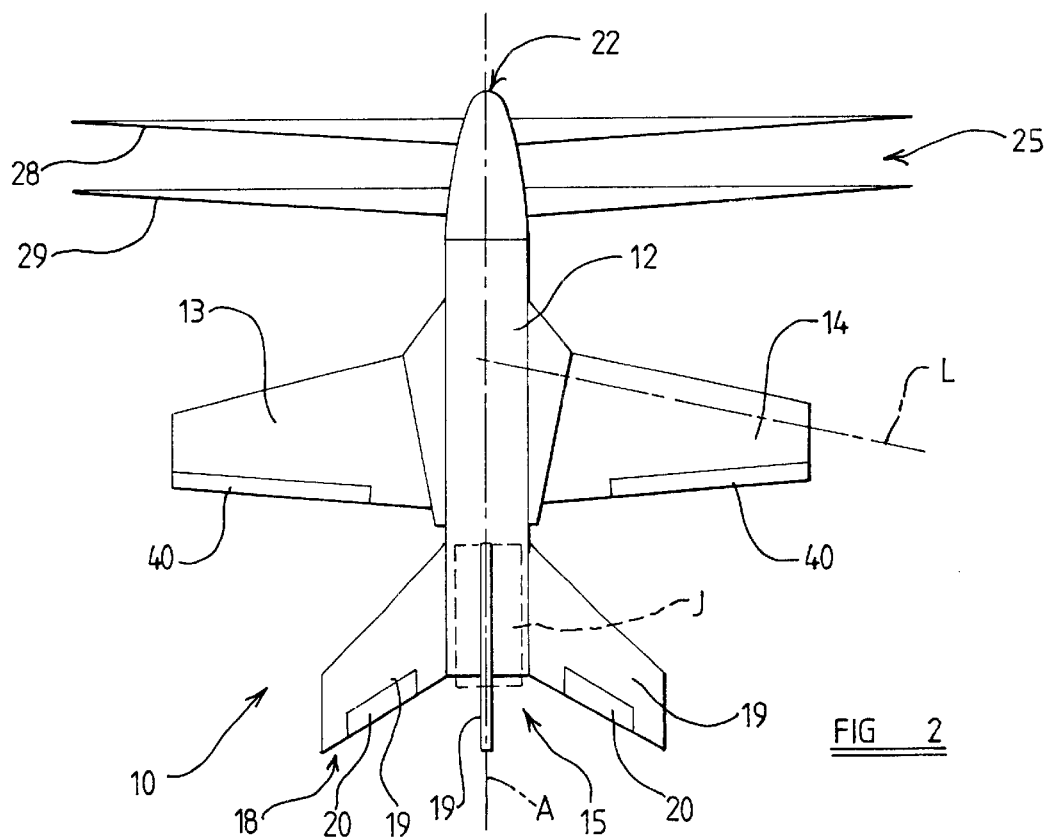
FIG. 2 is an illustrative plan view of the aircraft of FIG. 1 in normal cruise flight.

Once the aircraft 10 has taken-off, the aircraft 10 may be manoeuvred for normal cruise flight as seen in FIG. 2, in which the fuselage 12 is generally horizontal. Such manoeuvring may be achieved by adjusting the rotors' blades, and/or operating control surfaces such as ailerons/flaps 40, 20 provided on the wings 13, 14 and the tail structure 15. In normal cruise flight, two of the tail wings 19 may or may not be generally vertical or horizontal as desired.

During transition to normal cruise flight, the wings 13, 14 are moved relatively to the fuselage 12 outwardly to a spread position seen in FIG. 2 to reduce the angle θ from that shown in FIG. 1, to an angle in which the wing quarter chord line L extends perpendicularly or more nearly perpendicularly to the aircraft fuselage (longitudinal) centre line 21, than when the wings 13, 14 are in the rearwardly swept position. In this position, the wings 13, 14 present a higher aspect ratio than when the wings 13, 14 are in the rearwardly swept position. At least in normal cruise, relatively slow forward flight, the higher aspect ratio of the wing improves the control of the aircraft 10, by providing an improved lift/drag ratio to optimise efficiency of the aircraft 10.

During normal cruise flight, the rotors 28, 29 operate as a propeller system to provide thrust for forward flight.

For landing the aircraft, the fuselage 12 is manoeuvred into vertical flight and the wings 13, 14 are again moved to the rearwardly swept position shown in FIG. 1. Thus the aircraft 10 is landed vertically.

Although in the example described, thrust for vertical and normal cruise flight is achieved by a rotor/propeller system 25, in another example thrust at least for normal cruise flight, but if desired for vertical flight too, may be achieved by a jet thrust means such as a jet engine provided in the fuselage 12 e.g. as indicated at J in FIG. 2, at or adjacent the tail end 15 thereof Thus the aircraft may have both a rotor/propeller system 25 and a jet thrust means J to develop thrust, or a jet thrust means J or rotor/propeller system 25 only.

Mechanisms for achieving win, movement outwardly and inwardly relative to the fuselage are known for use on aircraft which take-off and land conventionally i.e. in a generally horizontal condition. It is envisaged that a similar mechanism may be used for moving the wings 13, 14 in an aircraft in accordance with the invention.

What is claimed is:

1. An aircraft having a fuselage and a pair of wings, and being capable of vertical take off with the fuselage generally vertical and normal cruise flight with the fuselage generally horizontal the wings being movable relative to the fuselage from a rearwardly swept position to which the wings are moved for vertical take off, to a spread position having a higher aspect ratio to which the wings are moved for normal cruise flight the aircraft further being capable of a controlled landing.

2. An aircraft according to claim 1 wherein the aircraft has a tail structure including tail wings and, prior to take off, the aircraft sits on the tail structure.

3. An aircraft according to claim 2 wherein the tail structure is of cruciform configuration.

4. An aircraft according to claim 1 wherein the aircraft is capable of both vertical take-off and vertical landing and the wings are moveable to the rearwardly swept position during landing as well as take-off.

5. An aircraft according to claim 1 wherein thrust for at least take-off is provided by a rotor/propeller system.

6. An aircraft according to claim 4 wherein thrust for vertical landing is provided by a propeller system.

7. An aircraft according to claim 5 wherein the rotor system includes a pair of contra-rotating rotors which mutually counteract torque reactions.

8. An aircraft according to claim 6 wherein the rotor system includes a pair of contra-rotating rotors which mutually counteract torque reactions.

9. An aircraft according to claim 8 wherein the rotor/propeller system is provided at or adjacent a nose structure of the aircraft.

10. An aircraft according to claim 5 wherein thrust for at least take-off is provided by a jet thrust means.

11. An aircraft according to claim 4 wherein thrust for vertical landing is provided by jet thrust means.

12. An aircraft according to claim 10 wherein the jet thrust means is provided in the fuselage at a tail end of the aircraft.

13. An aircraft according to claim 11 wherein the jet thrust means is provided in the fuselage at a tail end of the aircraft.

14. An aircraft according to claim 5 wherein a rotor system is used to achieve thrust during at least take-off and thrust means are provided by a jet thrust during normal cruise flight.

15. An aircraft according to claim 6 wherein the aircraft is an un-manned aerial vehicle.

16. A method of operating an aircraft having a fuselage and a pair of wings and being capable of vertical take off with the fuselage generally vertical and normal cruise flight with the fuselage generally horizontal, the method including moving the wings relative to the fuselage to a rearwardly swept position for vertical take off, operating a thrust means to achieve vertical take-off, maneuvering the aircraft to the normal cruise flight condition, moving the wings relative to the fuselage to a spread position for normal cruise flight and moving the wings relative to the fuselage to a rearwardly swept position for landing.

17. A method according to claim 16 wherein the wings are moved relative to the fuselage from the swept position to the spread position during the transition from vertical flight to normal cruise flight.

18. A method according to claim 16 wherein the wings are moved from the spread position to the rearwardly swept position during transition from normal cruise flight to vertical flight prior to vertical landing.

\* \* \* \* \*